(12) United States Patent
Song et al.

(10) Patent No.: US 8,810,763 B2
(45) Date of Patent: Aug. 19, 2014

(54) PIXEL ELECTRODE STRUCTURE OF DISPLAY DEVICE

(75) Inventors: Moo Hyoung Song, Daegu-si (KR); Hoan Su Shim, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 1282 days.

(21) Appl. No.: 11/637,109

(22) Filed: Dec. 12, 2006

(65) Prior Publication Data

US 2008/0002122 A1 Jan. 3, 2008

(30) Foreign Application Priority Data

Jun. 30, 2006 (KR) .................. 10-2006-0060207

(51) Int. Cl.
*G02F 1/1337* (2006.01)
*G02F 1/1343* (2006.01)

(52) U.S. Cl.
USPC ........................ 349/141; 349/129; 349/144

(58) Field of Classification Search
USPC ........................ 349/129, 141, 144
See application file for complete search history.

(56) References Cited

U.S. PATENT DOCUMENTS

| | | | |
|---|---|---|---|
| 6,646,707 B2 * | 11/2003 | Noh et al. | 349/141 |
| 2002/0041354 A1 * | 4/2002 | Noh et al. | 349/141 |
| 2003/0086044 A1 * | 5/2003 | Inoue et al. | 349/141 |
| 2004/0169777 A1 * | 9/2004 | Tanaka et al. | 349/39 |
| 2005/0088600 A1 | 4/2005 | Mizoguchi | |
| 2005/0105033 A1 | 5/2005 | Itou et al. | |
| 2005/0206825 A1 * | 9/2005 | Kaneko et al. | 349/141 |
| 2006/0256271 A1 * | 11/2006 | Shimoshikiryo | 349/144 |

FOREIGN PATENT DOCUMENTS

| | | |
|---|---|---|
| KR | 10-2002-0028477 A | 4/2002 |
| KR | 10-2004-0106506 A | 12/2004 |
| KR | 10-2008-0002122 A | 1/2008 |
| WO | WO-03/096112 A1 | 11/2003 |

* cited by examiner

*Primary Examiner* — Jessica M Merlin
(74) *Attorney, Agent, or Firm* — Birch, Stewart, Kolasch & Birch, LLP

(57) ABSTRACT

A pixel electrode structure of a display device is discussed. According to an embodiment, the pixel electrode structure includes a plurality of sub pixel electrodes disposed substantially in parallel in the pixel region, wherein the sub pixel electrodes have progressively greater widths and progressively greater spaces therebetween starting from one side of the pixel region to the other opposite side of the pixel region.

11 Claims, 3 Drawing Sheets

PIXEL ELECTRODE STRUCTURE OF DISPLAY DEVICE

This application claims the priority benefit of Korean Patent Application No. 2006-060207, filed on Jun. 30, 2006, which is hereby incorporated by reference for all purposes as if fully set forth herein.

BACKGROUND OF THE INVENTION

1. Field of the Invention

The present invention relates to a pixel electrode structure of a display device. More particularly, the present invention relates to a pixel electrode structure that is adaptive for improving a display quality of an image.

2. Description of the Related Art

In recent years, with the development of an information processing apparatus for processing massive data, a display device that displays the data processed at the information processing apparatus as an image has been actively developed. As the display device, a flat panel display device, representatively such as a liquid crystal display (LCD) device, a plasma display panel (PDP), or an organic light emitting device (OLED) is mainly used.

A twisted nematic (TN) mode, which is one kind of an LCD device, has advantages such as a rapid response speed and a low driving voltage. Whereas, the TN mode LCD device has a drawback that a viewing angle is not so good due to the refractive index anisotropy of liquid crystals, because the liquid crystal molecules are aligned along an electric field vertically applied thereto.

To address the drawbacks of the TN mode LCD device, an in-plane switching (IPS) mode LCD device has been developed recently.

In the IPS mode LCD device, since the electrical field is horizontally applied to the liquid crystals in parallel with the substrate, it is possible to obtain excellent viewing angle characteristics compared with the TN mode LCD device.

In order to form the horizontal electric field in parallel with the substrate, the IPS mode LCD device employs a comb-shaped pixel electrode. FIG. 1 is a plan view of a pixel electrode structure applied to an IPS mode LCD device according to a related art.

Referring to FIG. 1, a common electrode 3 is formed on a substrate 1. The common electrode 3 is a transparent conductive layer, and the substrate 1 is the lower substrate of the LCD device.

Although not shown, an insulating layer is disposed on the common electrode 3 such that it covers the common electrode 3, and a plurality of pixel electrodes 5 are disposed on the insulating layer. The plurality of pixel electrodes 5 are disposed on positions of the insulating layer corresponding to the common electrode 3 such that they are arranged in parallel. The pixel electrodes 5 disposed on the insulating layer, for example, may be formed of a transparent conductive material.

A pair of neighboring pixel electrodes 5 in the related art IPS mode LCD device have the same width W, respectively. The pair of neighboring pixel electrodes 5 with the same width W are arranged on the insulating layer such that they are separated by the same space L.

The pixel electrodes 5 having the same width W and the same space L may be commonly applied to the IPS mode LCD device and a fringe field switching (FFS) mode LCD device. Generally, in the IPS mode LCD device and the FFS mode LCD device, a display quality of an image is determined by the space L and the width W of the pixel electrode 5.

As denoted by the solid lines in FIG. 1, if the neighboring pixel electrodes 5 are equally separated by the space L and have the same width W in the IPS mode LCD device and the FFS mode LCD device, the display quality of the image can be improved. However, in reality, the space L between the neighboring pixel electrodes 5 and the width W of the pixel electrodes 5 may not be uniform (i.e., they vary randomly, without any preset pattern) as shown by the dotted lines in FIG. 1. As a result, the display quality of the image displayed by the related art IPS mode LCD device and the related art FFS mode LCD device can be seriously degraded.

SUMMARY OF THE INVENTION

Accordingly, the present invention is directed to a pixel electrode structure of a display device and to the display device such as an LCD device having the pixel electrode structure, which substantially address one or more problems due to limitations and disadvantages of the related art.

An object of the present invention is to provide a pixel electrode structure of a display device and the display device, which are capable of preventing a display quality of an image from being degraded.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided according to an embodiment of the present invention a pixel electrode structure of a display device disposed in first and second pixel regions to which an electric field is applied for displaying an image, the pixel electrode structure including: first sub pixel electrodes disposed in parallel in the first pixel region, wherein the first sub pixel electrodes have progressively greater widths and spaces therebetween from a boundary between the first and second pixel regions; and second sub pixel electrodes disposed in parallel in the second pixel region, wherein the second sub pixel electrodes have progressively greater widths and/or spaces therebetween from the boundary between the first and second pixel regions.

According to an aspect of the present invention, there is provided a pixel electrode structure of a display device, for being disposed in a pixel region to which an electric field is applied for displaying an image, the pixel electrode structure comprising: a plurality of sub pixel electrodes disposed substantially in parallel in the pixel region, wherein the sub pixel electrodes have progressively greater widths and progressively greater spaces therebetween starting from one side of the pixel region to the other opposite side of the pixel region.

According to another aspect of the present invention, there is provided a pixel electrode structure of a display device, for being disposed in first and second pixel regions to which an electric field is applied for displaying an image, the pixel electrode structure comprising: first sub pixel electrodes disposed substantially in parallel in the first pixel region, wherein the first sub pixel electrodes have progressively greater widths and progressively greater spaces therebetween starting from a boundary between the first and second pixel regions to one side of the first pixel region; and second sub pixel electrodes disposed substantially in parallel in the second pixel region, wherein the second sub pixel electrodes have progressively greater widths and progressively greater spaces therebetween starting from the boundary to one side of the second pixel region.

According to another aspect of the present invention, there is provided a display device comprising: a plurality of pixel regions to which an electric field is applied for displaying an image, each pixel region including a pixel electrode structure having a plurality of sub pixel electrodes disposed substantially in parallel in the corresponding pixel region, wherein the sub pixel electrodes in each pixel region have progressively greater widths and/or progressively greater spaces therebetween starting from one side of the corresponding pixel region to the other opposite side of the corresponding pixel region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
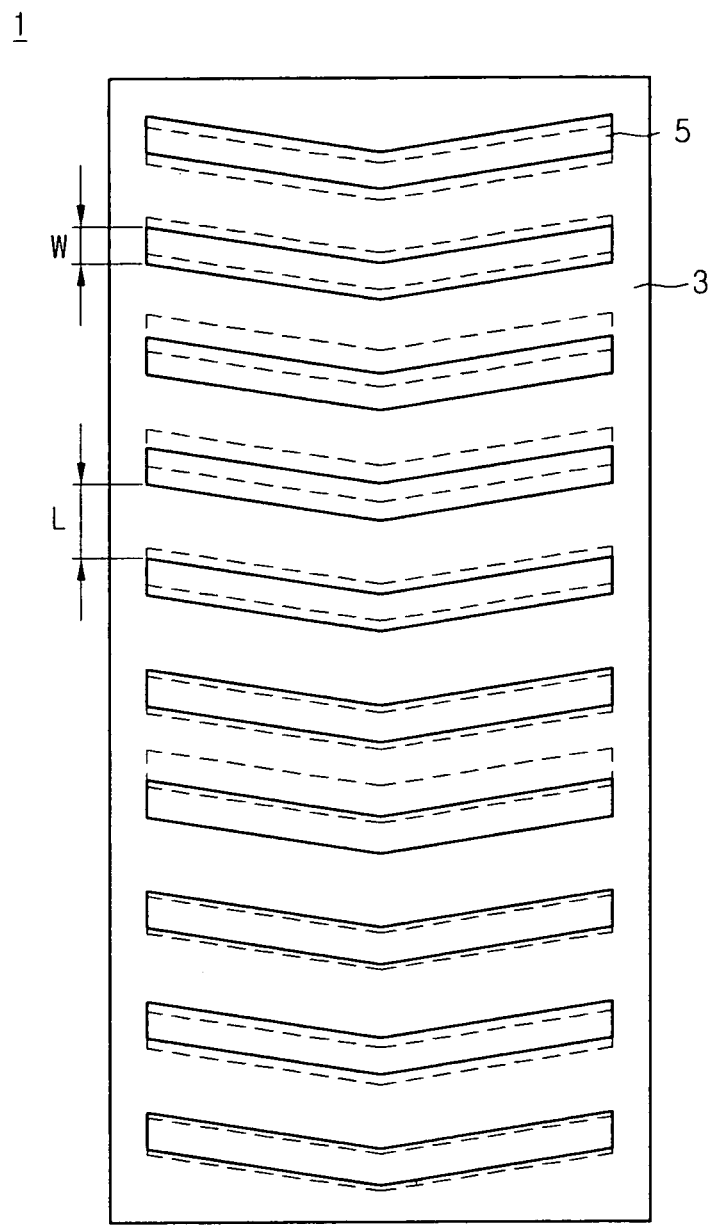
FIG. 1 is a plan view of a pixel electrode structure applied to an in-plane switching (IPS) mode LCD device according to a related art.
Figure 2:
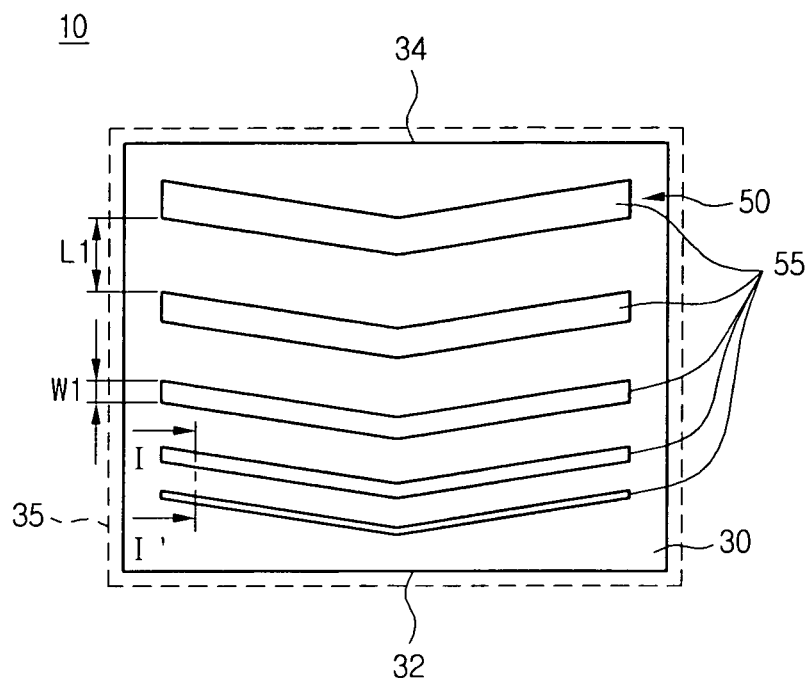
FIG. 2 is a plan view illustrating a pixel electrode structure of a display device according to one embodiment of the present invention.
Figure 3:
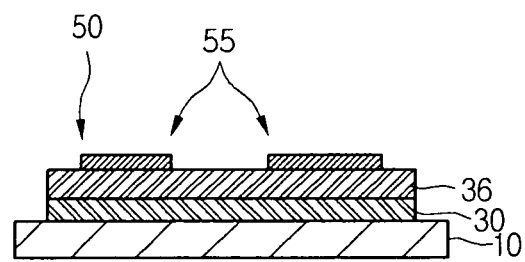
FIG. 3 is a sectional view taken along the line □-□' in FIG. 2.

FIG. 2 is a plan view illustrating a pixel electrode structure of a display device according to one embodiment of the present invention. FIG. 3 is a sectional view taken along the line □-□' in FIG. 2.

Referring to FIGS. 2 and 3, a common electrode 30 is formed on a substrate 10. The common electrode 30 may include a transparent conductive layer. The common electrode may be disposed in a pixel region 35. The substrate 10 can be a lower substrate of the display device, such as a TFT array substrate of an IPS mode LCD device. The pixel region 35 can be the display area (or a portion thereof) of the display device.

An insulating layer 36 may be disposed on the common electrode 30 to cover the common electrode 30. A pixel electrode 50 is disposed on a top surface of the insulating layer 36. In this embodiment, the pixel electrode 50 may include a plurality of sub pixel electrodes 55. The sub pixel electrodes 55 are juxtaposed in a direction parallel to each other in the pixel region 35.

Examples of material that may be used as the sub pixel electrodes 55 include indium tin oxide (ITO), indium zinc oxide (IZO) or amorphous indium tin oxide (a-ITO), etc. Alternatively, the sub pixel electrodes 55 (may include aluminum or aluminum alloy, etc.

The sub pixel electrodes 55 on the insulating layer 36 may substantially have line shapes in a plan view. Particularly, the sub pixel electrodes 55 are formed in the shape of a crooked pattern bent at an obtuse angle. For example, each of the sub pixel electrodes 55 may substantially have a 'V' shape in a plan view. Alternatively, each of the sub pixel electrodes 55 may substantially have the crooked shape having an inflection point. Alternatively, each of the sub pixel electrodes 55 may substantially have a variety of shapes such as a W shape, a curved shape, etc. In addition, the bent angle of the sub pixel electrode 55 may be variously changed.

Thereinafter, for the sake of illustrative convenience, one side and the other side of the pixel region 35 are designated as a reference numeral 32 and 34, respectively, wherein the one side and the other side of the pixel region 35 face each other.

In the present invention, widths W1 of the sub pixel electrodes 35 and spaces L1 between adjacent two sub pixel electrodes 35 are considered important factors because the display quality of an image displayed by the display device is determined by the widths W1 and the spaces L1. In this embodiment, the widths W1 of the sub pixel electrodes 35 and the spaces L1 between each of the adjacent two sub pixel electrodes 35 are determined such that the display quality of the image is not degraded even though the sub pixel electrodes 55 have different widths W1 and different spaces L1 therebetween.

In the embodiments, the widths W1 of the respective sub pixel electrodes 55 may be orderly changed, i.e., not randomly but according to a preset pattern. For instance, as the sub pixel electrode 55 is far away from one side 32 of the pixel region, the width W1 of the sub pixel electrode 55 tends to increase gradually, e.g., at a certain increment. For instance, the width W1 of the narrowest sub pixel electrode 55 may be about 3 μm, and the width W1 of the widest sub pixel electrode 55 may be about 13 μm. That is, the widths W1 of the sub pixel electrodes 55 may be changed orderly within a range of about 3 μm to about 13 μm. For instance, the widths W1 of the sub pixel electrodes 55 may gradually increase starting from one side 32 to the opposite side 34 of the pixel region 35, as shown in FIG. 2, and such increases can be made according to a preset pattern. For instance, only as an example, the widths W1 starting from one side 32 to the opposite side 34 can be 3 μm, 4 μm, 6 μm, 9 μm, 12 μm, respectively, where the increases between the adjacent widths W1 are 1 μm, 2 μm, 3 μm and 4 μm, respectively. Other examples and variations are possible.

Similarly, the space L1 between the adjacent two sub pixel electrodes 55 included in the pixel electrode 50 may be orderly (i.e., not randomly) changed from the one side 32 to the other side 34 of the pixel region 35. For instance, the narrowest space L1 between two adjacent sub pixel electrodes 55 (e.g., at the side 32) may be about 3 μm, and the widest space L1 between two adjacent sub pixel electrodes 55 (e.g., at the side 34) may be about 13 μm. That is, the space L1 between the neighboring sub pixel electrodes 55 may be changed orderly within a range of about 3 μm to about 13 μm. For instance, the spaces L1 of the sub pixel electrodes 55 may gradually increase starting from one side 32 to the opposite side 34 of the pixel region 35, a shown in FIG. 2, and such increases can be made according to a preset pattern. For instance, only as an example, the spaces L1 starting from one side 32 to the opposite side 34 can be 3 μm 4 μm, 6 μm, 9 μm, 12 μm, respectively, where the increases between the adjacent spaces L1 are 1 μm, 2 μm, 3 μm and 4 μm, respectively. Other examples and variations are possible.

According to the present invention, as the widths W1 and the spaces L1 of the sub pixel electrodes 55 included in the pixel electrode 50 are orderly changed, it is possible to prevent the degradation of the display quality of the image on the display device even if a position where the sub pixel electrode 55 is formed is changed unexpectedly.

Further, the widths W1 and the spaces L1 of the sub pixel electrode 55 according to the present invention affect a light transmittance thereby improving the display quality of the image, a mura degrading the display quality of the image, a threshold voltage Vth of a thin film transistor, and a driving voltage Vop of the thin film transistor.

When increasing the widths W1 and the spaces L1 of the sub pixel electrodes 55 orderly, the light transmittance and the driving voltage Vop may increase. Whereas, when decreasing the widths W1 and the spaces L1 of the sub pixel electrodes 55 orderly, quality defect such as the mura may occur and further the light transmittance and the threshold voltage Vth may decrease.

Meanwhile, according to an embodiment, the sub pixel electrode 55 is fabricated in the crooked shape bent at an obtuse angle in a plan view so that the present invention provides the same effect as the case of forming the multi-domains. That is, as a result, it is possible to improve the viewing angle of the image by the present invention.

Figure 4:
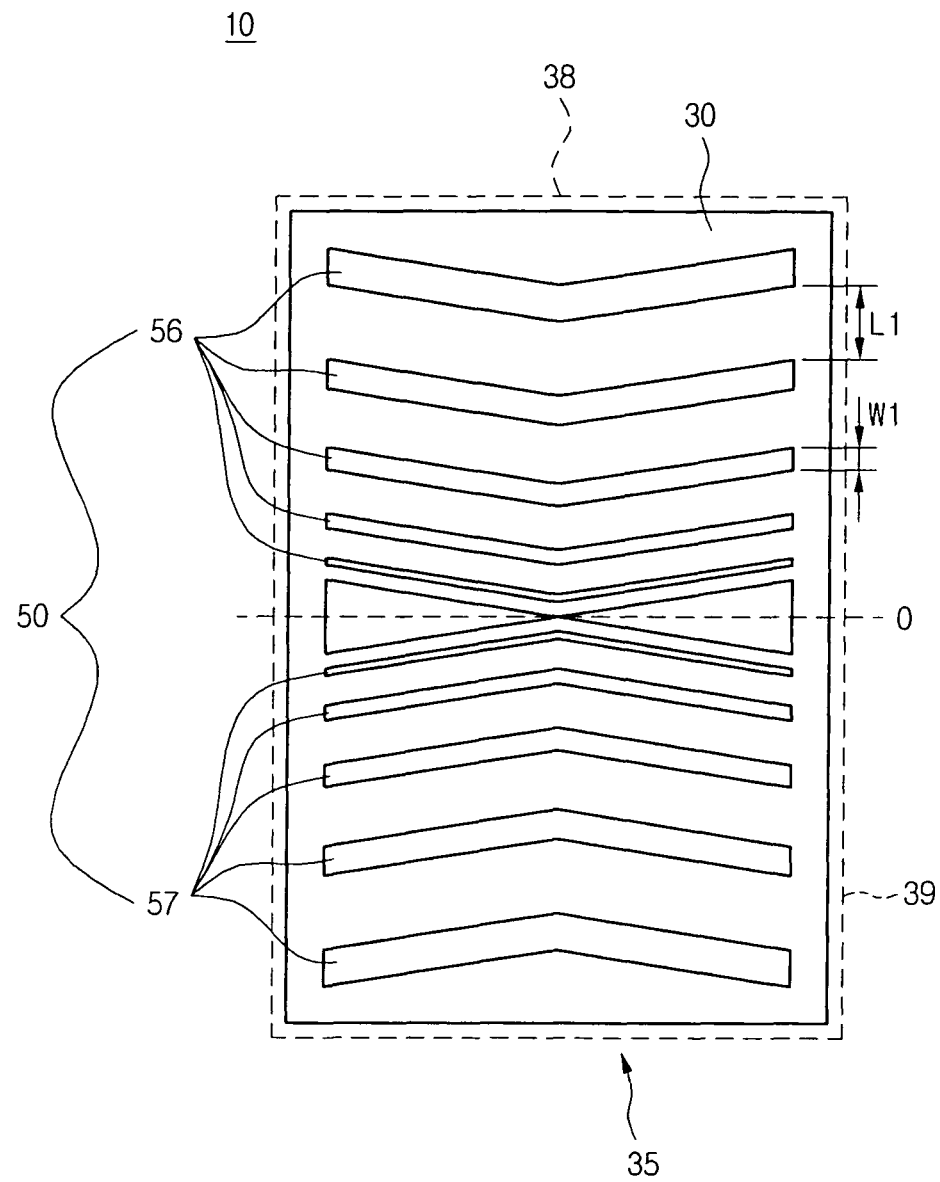
FIG. 4 is a plan view illustrating a pixel electrode structure of a display device according to another embodiment of the present invention.

FIG. 4 is a plan view illustrating a pixel electrode structure of a display device according to another embodiment of the present invention.

Referring to FIG. 4, the common electrode 30 is formed on the substrate 10. The common electrode 30 may include a transparent conductive layer. The common electrode 30 is disposed over a pixel region 35 including first and second pixel regions 38 and 39. In this embodiment, the first and second pixel regions 38 and 39 are disposed in series, i.e., adjacent to and contacting each other.

An insulating layer (such as the insulating layer 36 in FIG. 2) is disposed on the common electrode 30 to cover the common electrode 30. A pixel electrode 50 is disposed on the insulating layer. In this embodiment, the pixel electrode 50 includes a plurality of first sub pixel electrodes 56 which are disposed in parallel on the first pixel region 38, and a plurality of second sub pixel electrodes 57 which are disposed in parallel on the second pixel region 39.

The plurality of first and second sub pixel electrodes 56 and 57 disposed on the first and second pixel regions 38 and 39 may include indium tin oxide (ITO), indium zinc oxide (IZO) or amorphous indium tin oxide (a-ITO), etc. Alternatively, the first and second sub pixel electrodes 56 and 57 may include aluminum or aluminum alloy.

The first and second sub pixel electrodes 56 and 57 may have crooked line shapes bent at an oblique angle. Besides, the first and second sub pixel electrodes 56 and 57 may have various shapes and various bent angles. Alternatively, the first and second sub pixel electrodes 56 and 57 may have V or W shapes.

Bent portions of the first sub pixel electrodes 56 are opposite to and bent portions of the second sub pixel electrodes 57 in a plan view. The first sub pixel electrodes 56 may be symmetric to the second sub pixel electrodes 57 with respect to a boundary 0 between the first and second pixel regions 38 and 39.

The first and/or second sub pixel electrodes 56 and 57 have progressively/gradually greater width W1 as they are farther away from the boundary 0 between the first and second pixel regions 38 and 39. In an example, the width W1 of the narrowest sub pixel electrode among the first or second sub pixel electrodes 56 and 57 may be about 3 μm, and the width W1 of the widest sub pixel electrode among the first or second sub pixel electrodes 56 and 57 may be about 13 μm. That is, the first and/or second sub pixel electrodes 56 and 57 may have widths W1 in the range of about 3 μm to about 13 μm. For instance, only as an example, the widths W1 starting from the boundary 0 to its opposite side in the first and/or second pixel regions 38 and 39 can be 3 μm, 4 μm, 6 μm, 9 μm, 12 μm, respectively, where the increases between these widths W1 are 1 μm, 2 μm, 3 μm and 4 μm, respectively. Other examples and variations are possible.

Meanwhile, the space L1 between two adjacent sub pixel electrodes of the first and/or second sub pixel electrodes 56 and 57 becomes progressively/gradually greater as they are farther away from the boundary 0. In an example, the smallest space L1 between two neighboring sub pixel electrodes of the first and/or second sub pixel electrodes 56 and 57 may be about 3 μm, and the largest space L1 therebetween may be about 13 μm. That is, the space L1 between two neighboring ones of the first and/or second sub pixel electrodes 56 and 57 may be in the range of about 3 μm to about 13 μm. For instance, only as an example, the spaces L1 starting from the boundary 0 to its opposite side in the first and/or second pixel regions 38 and 39 can be 3 μm, 4 μm, 6 μm, 9 μm, 12 μm, respectively, where the increases between these spaces L1 are 1 μm, 2 μm, 3 μm and 4 μm, respectively. Other examples and variations are possible.

In this embodiment, one of the first sub pixel electrodes 56 having the smallest width W1 and space L1 is arranged in the vicinity of the boundary 0. Likewise, one of the second sub pixel electrodes 57 having the smallest width W1 and space L1 is also arranged in the vicinity of the boundary 0. As the sub pixel electrode 56 and 57 are farther away from the boundary 0, the width W1 of the first and/or second sub pixel electrode 56 and 57 and the space L1 between two neighboring ones of the first and/or second sub pixel electrodes 56 and 57 become greater.

In this embodiment, the widths W1 and spaces L1 of the first and second sub pixel electrodes 56 and 57 are orderly adjusted from the boundary 0 so that it is possible to improve the display quality of the image in the display device. In other words, as the widths W1 and the spaces L1 of the first and second sub pixel electrodes 56 and 57 included in the pixel electrode 50 are orderly changed, it is possible to prevent the degradation of the display quality of the image even if a position where the sub pixel electrode 56, 57 is formed is changed unexpectedly.

The widths W1 and the spaces L1 of the first and second sub pixel electrodes 56 and 57 according to the present invention affect the light transmittance improving display quality of image, the mura degrading the display quality of image, the threshold voltage Vth and the driving voltage Vop.

When increasing the widths W1 and the spaces L1 of the first and second sub pixel electrodes 56 and 57 orderly, the light transmittance and the driving voltage Vop may increase. In contrast, when decreasing the widths W1 and the spaces L1 of the first and second sub pixel electrodes 56 and 57 orderly, quality defect such as the mura may occur and the light transmittance and the threshold voltage Vth may decrease.

Meanwhile, in one example, the first and second sub pixel electrodes 56 and 57 are fabricated in the crooked shape bent at an obtuse angle in a plan view so that the present invention provides the same effect as the case of forming the multi-domains. That is, it is possible to improve the viewing angle of the image in the display device of the present invention.

According to the present invention described as above, a critical dimension (CD) of the pixel electrode is changed by orderly (not randomly) differentiating the spaces and widths of the pixel electrodes from the boundary between the first and second pixel regions. Thus, it is possible to prevent the degradation of the display quality of the image in the display device of the present invention.

According to the present invention, the display device can be, but is not limited to, an LCD device such as an IPS mode LCD device, a FFS mode LCD device, etc. and thus includes known components (liquid crystal layer, TFTs, etc.) of such device. Also, in the display device of the present invention, only the widths W1 may be orderly varied, only the spaces L1 may be orderly varied, or both the widths W1 and the spaces L1 may be orderly varied. For instance, in the example of FIG. 2, the widths W1 and/or the spaces L1 may be orderly varied as discussed above. In the example of FIG. 4, the widths W1 and/or the spaces L1 in the first and/or second pixel regions 38 and 39 may be orderly varied as discussed above. Also, in the example of FIG. 4, the widths W1 and/or the spaces L1 in the first and/or second pixel regions 38 and 39 may progressively increase starting from the end side of the first or second pixel regions 38 and 39 to the boundary 0.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A pixel electrode structure of a display device, for being disposed in an upper left sub pixel region, an upper right sub pixel region, a lower left sub pixel region and a lower right sub pixel region of a pixel region, the pixel electrode structure comprising:
   a plurality of first sub pixel electrodes on the upper left sub pixel region and the upper right sub pixel region, and each having at least two ends opposite to each other; and
   a plurality of second sub pixel electrodes on the lower left sub pixel region and the lower right sub pixel region, and each having at least two ends opposite to each other,
   wherein one first sub pixel electrode includes a first portion on the upper left sub pixel region and a second portion on the upper right sub pixel region,
   wherein one second sub pixel electrode includes a first portion on the lower left sub pixel region and a second portion on the lower right sub pixel region,
   wherein the first portion of the one first sub pixel electrode is symmetrical to the second portion of the one first sub pixel electrode with respect to a vertical line and is symmetrical to the first portion of the one second sub pixel electrode with respect to a horizontal line perpendicular to the vertical line,
   wherein the second portion of the one second sub pixel electrode is symmetrical to the first portion of the one second sub pixel electrode with respect to the vertical line and is symmetrical to the second portion of the one first sub pixel electrode with respect to the horizontal line,
   wherein the upper right sub pixel region and the upper left sub pixel region form a first pixel region and the lower right sub pixel region and the lower left sub pixel region form a second pixel region,
   wherein each of the plurality of first sub pixel electrodes has a bent line shape and is disposed substantially in parallel to each other,
   wherein the plurality of first sub pixel electrodes have progressively greater widths and progressively greater intervals therebetween starting from one side of the first pixel region near the horizontal line between the first and second pixel regions to the other side of the first pixel region opposite to the one side of the first pixel region,
   wherein the upper right sub pixel region and the upper left sub pixel region form a first pixel region and the lower right sub pixel region and the lower left sub pixel region form a second pixel region,
   wherein each of the plurality of second sub pixel electrodes has a bent line shape and is disposed substantially in parallel to each other, and
   wherein the plurality of second sub pixel electrodes have progressively greater widths thereof and progressively greater intervals therebetween starting from one side of the second pixel region near the horizontal line to the other side of the second pixel region opposite to the one side of the second pixel region.

2. The pixel electrode structure according to claim 1, wherein the first and second sub pixel electrodes have crooked shapes in a plan view.

3. The pixel electrode structure according to claim 2, wherein the first and second sub pixel electrodes are bent at an obtuse angle.

4. The pixel electrode structure according to claim 2, wherein bent portions of the first sub pixel electrodes are opposite to bent portions of the second sub pixel electrodes with respect to the horizontal line between the upper right sub pixel region and the upper left sub pixel region forming a first pixel region and the lower right sub pixel region and the lower left sub pixel region forming a second pixel region.

5. The pixel electrode structure according to claim 1, wherein a minimum width of the first and second sub pixel electrodes is about 3 μm and a maximum width of the first and second sub pixel electrodes is about 13 μm.

6. The pixel electrode structure according to claim 1, wherein a minimum interval between the neighboring first sub pixel electrodes or between the neighboring second sub pixel electrodes is about 3 μm and a maximum interval between the neighboring first sub pixel electrodes or between the neighboring second sub pixel electrodes is about 13 μm.

7. The pixel electrode structure according to claim 1, wherein the first and second sub pixel electrodes include one material selected from the group consisting of indium tin oxide (ITO), indium zinc oxide (IZO) and amorphous indium tin oxide (a-ITO), or the first and second sub pixel electrodes include one material selected from the group consisting of aluminum and aluminum alloy.

8. The pixel electrode structure according to claim 1, wherein the first and second sub pixel electrodes to which a same voltage are applied are disconnected from each other.

9. The pixel electrode structure according to claim 1, wherein the first portion of the one first sub pixel electrode has a first acute angle with respect to the vertical line and the second portion has a second acute angle with respect to the vertical line,
   wherein the first portion of the one second sub pixel electrode had a third acute angle with respect to the vertical line and the second portion has a fourth acute angle with respect to the vertical line,
   wherein the first acute angle of the one first sub pixel electrode is substantially identical to the second acute angle of the one first sub pixel electrode, wherein the third acute angle of the one second sub pixel electrode is substantially identical to the fourth acute angle of the one second sub pixel electrode,
wherein the first acute angle and the second acute angle have a positive angle with respect to the vertical line, and
wherein the third acute angle and the fourth acute angle have a negative angle with respect to the vertical line.

10. The pixel electrode structure according to claim 1, wherein the plurality of first sub pixel electrodes have bar shapes completely spaced apart from each other.

11. The pixel electrode structure according to claim 1, wherein the plurality of second sub pixel electrodes have bar shapes completely spaced apart from each other.

* * * * *